United States Patent
Hall et al.

(10) Patent No.: US 10,402,326 B1
(45) Date of Patent: Sep. 3, 2019

(54) ACCESSING MEMORIES IN COHERENT AND NON-COHERENT DOMAINS IN A COMPUTING SYSTEM

(71) Applicant: Apple Inc., Cupertino, CA (US)

(72) Inventors: Ronald P. Hall, Cedar Park, TX (US); Mahesh K. Reddy, Austin, TX (US); David J. Williamson, Austin, TX (US)

(73) Assignee: Apple Inc., Cupertino, CA (US)

( * ) Notice: Subject to any disclaimer, the term of this patent is extended or adjusted under 35 U.S.C. 154(b) by 102 days.

(21) Appl. No.: 15/138,666

(22) Filed: Apr. 26, 2016

(51) Int. Cl.
*G06F 12/0815* (2016.01)

(52) U.S. Cl.
CPC .... *G06F 12/0815* (2013.01); *G06F 2212/622* (2013.01)

(58) Field of Classification Search
CPC .................. G06F 12/0815; G06F 2212/622
See application file for complete search history.

(56) References Cited

U.S. PATENT DOCUMENTS

| | | | |
|---|---|---|---|
| 7,096,305 B2 | 8/2006 | Moll | |
| 7,394,823 B2 | 7/2008 | Sano | |
| 2008/0228871 A1 | 9/2008 | Sano | |
| 2008/0320233 A1* | 12/2008 | Kinter | G06F 12/0804 711/143 |
| 2014/0379993 A1 | 2/2014 | Gupta et al. | |
| 2015/0178202 A1* | 6/2015 | Sankaran | G06F 12/0811 711/122 |
| 2017/0091090 A1* | 3/2017 | Wang | G06F 12/0808 |
| 2017/0177484 A1* | 6/2017 | Conway | G06F 12/0815 |
| 2017/0212845 A1* | 7/2017 | Conway | G06F 12/0833 |

* cited by examiner

*Primary Examiner* — Tracy A Warren
(74) *Attorney, Agent, or Firm* — Meyertons, Hood, Kivlin, Kowert & Goetzel, P.C.

(57) ABSTRACT

A system that includes circuitry to access memories in both coherent and non-coherent domains is disclosed. The circuitry may receive a command to access a memory included in the coherent domain and generate one or more commands to access a memory in the non-coherent domain dependent upon the received command. The circuitry may send the generated one or more commands to the memory in the non-coherent domain via communication bus.

19 Claims, 7 Drawing Sheets

ACCESSING MEMORIES IN COHERENT AND NON-COHERENT DOMAINS IN A COMPUTING SYSTEM

BACKGROUND

Technical Field

Embodiments described herein relate to integrated circuits, and more particularly, to techniques for command translation between coherent and non-coherent domains.

Description of the Related Art

Computing systems may include one or more systems-on-a-chip (SoC), which may integrate a number of different functions, such as, graphics processing, onto a single integrated circuit. With numerous functions included in a single integrated circuit, chip count may be kept low in mobile computing systems, such as tablets, for example, which may result in reduced assembly costs, and a smaller form factor for such mobile computing systems.

To implement the desired functions on an SoC, one or more processors may be employed. Each processor may include a memory system with multiple levels of caches for providing low latency access to program instructions and operands. With multiple processors accessing multiple caches as well as main memory, the issue of cache coherency may arise. For example, a given data producer, such as, e.g., one of processors, may write a copy of data in a cache, but the update to main memory's copy of the data may be delayed. In write-through caches, a write operation may be dispatched to memory in response to the write to the cache line, but the write is delayed in time. In a writeback cache, writes are made in the cache and not reflected in memory until the updated cache block is replaced in the cache (and is written back to main memory in response to the replacement).

Because the updates have not been made to main memory at the time the updates are made in cache, a given data consumer, such as, e.g., another processor, may read the copy of data in main memory and obtain "stale" data (data that has not yet been updated). A cached copy in a cache other than the one to which a data producer is coupled can also have stale data. Additionally, if multiple data producers are writing the same memory locations, different data consumers could observe the writes in different orders.

Cache coherence solves these problems by ensuring that various copies of the same data (from the same memory location) can be maintained while avoiding "stale data", and by establishing a "global" order of reads/writes to the memory locations by different producers/consumers. If a read follows a write in the global order, the data read reflects the write. Typically, caches will track a state of their copies according to the coherence scheme. For example, the popular Modified, Exclusive, Shared, Invalid (MESI) scheme includes a modified state (the copy is modified with respect to main memory and other copies); an exclusive state (the copy is the only copy other than main memory); a shared state (there may be one or more other copies besides the main memory copy); and the invalid state (the copy is not valid). The MOESI scheme adds an Owned state, in which the cache is responsible for providing the data for a request (either by writing back to main memory before the data is provided to the requestor, or by directly providing the data to the requester), but there may be other copies in other caches. Maintaining cache coherency is increasingly challenging as various different types of memory requests referencing uncacheable and cacheable regions of the address space are processed by the processor(s).

SUMMARY OF THE EMBODIMENTS

Various embodiments of a computing system are disclosed. Broadly speaking, a system is contemplated in which data is stored in a first memory according to a first coherency protocol. Circuitry may receive a first command to access the first memory and execution of the first command results in an access to the second memory. The circuitry may generate one or more second commands to access the second memory dependent upon the first command.

In one embodiment, the circuitry may send the one or more second commands to the second memory via a communication bus. In another non-limiting embodiment, the circuitry may receive one or more first responses from the second memory.

In a further embodiment, the circuitry may generate one or more second response in response to the first command. The one or more second responses may be dependent upon the one or more first responses.

BRIEF DESCRIPTION OF THE DRAWINGS

The following detailed description makes reference to the accompanying drawings, which are now briefly described.

Figure 1:
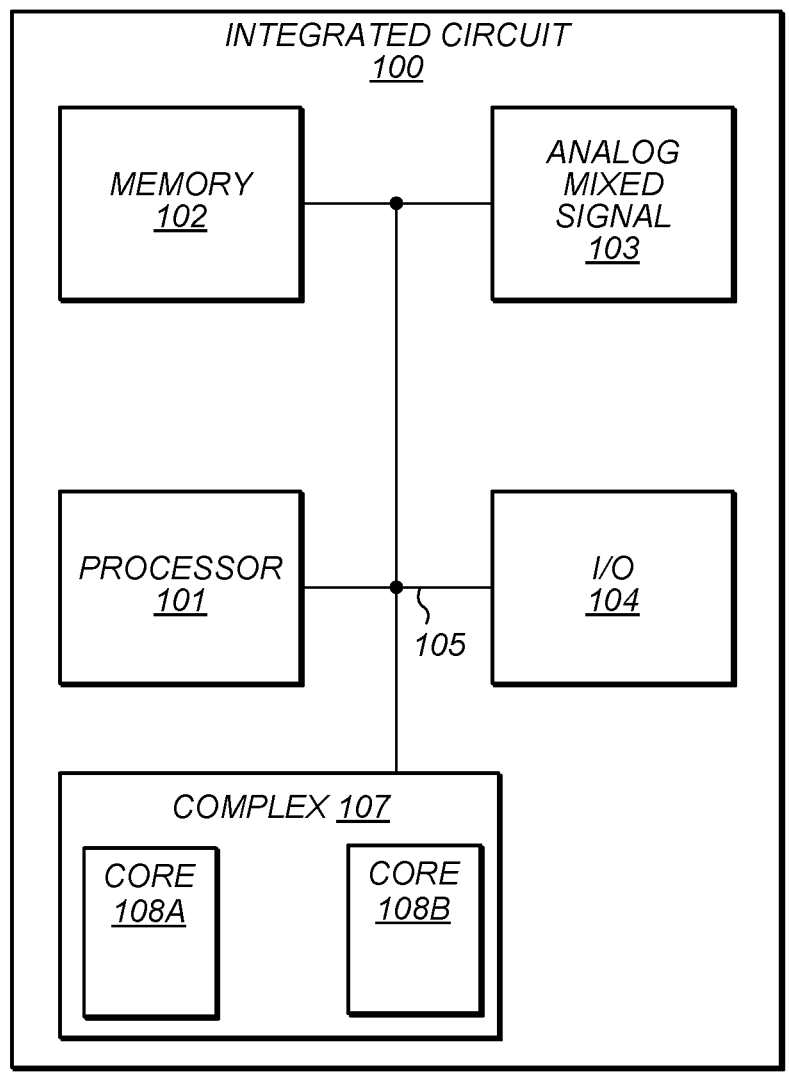
FIG. 1 illustrates an embodiment of an integrated circuit.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112, paragraph (f) interpretation for that unit/circuit/component. More generally, the recitation of any element is expressly intended not to invoke 35 U.S.C. § 112, paragraph (f) interpretation for that element unless the language "means for" or "step for" is specifically recited.

DETAILED DESCRIPTION OF EMBODIMENTS

To improve computational performance, a system-on-a-chip (SoC) may include multiple processors. Each processor may employ a local cache memory to provide rapid access to local copies of instructions and operands. When employing cache memories, multiple copies of data, such as, e.g., may exit. For example, there may a copy of an operand in main memory, in addition to a copy in each cache memory employed. When one of the copies of the operand is changed, the other copies must be updated as well. Maintaining consistency of data across the various memories is commonly referred to as maintaining "cache coherence."

To maintain coherence between main memory and various cache memories, requests may be sent to processors or other functional blocks within the SoC to perform certain tasks or provide certain data. The requests may need to be handled in a specific order to prevent the use of invalid cache data.

In some SoCs, some memories of storage devices may not be included as part of the coherence and consistency domain, i.e., such storage device may be included in a non-coherent domain. When a processor or processor core needs to access a device memory region in a non-coherent domain in the SoC, overall coherency may still need to be maintained. In such cases, the burden of maintaining coherency may be placed on software being executed on the SoC. This may result in additional software complexity and reduced system performance. The embodiments illustrated in the drawings and described below may provide techniques for a processor or processor core to access a non-coherent domain such as a device memory region while maintaining performance by keeping coherency between different level of caches within its own processor and reducing software overhead.

A block diagram of an integrated circuit including multiple functional units is illustrated in FIG. 1. In the illustrated embodiment, the integrated circuit 100 includes a processor 101, and a processor complex (or simply a "complex") 107 coupled to memory block 102, and analog/mixed-signal block 103, and I/O block 104 through internal bus 105. In various embodiments, integrated circuit 100 may be configured for use in a desktop computer, server, or in a mobile computing application such as, e.g., a tablet or laptop computer.

As described below in more detail, processor 101 may, in various embodiments, be representative of a general-purpose processor that performs computational operations. For example, processor 101 may be a central processing unit (CPU) such as a microprocessor, a microcontroller, an application-specific integrated circuit (ASIC), or a field-programmable gate array (FPGA).

Complex 107 includes processor cores 108A and 108B. Each of processor cores 108A and 108B may be representative of a general-purpose processor configured to execute software instructions in order to perform one or more computational operations. Processor cores 108A and 108B may be designed in accordance with one of various design styles and may include one or more cache memories. In various embodiments, coherency may be maintained across cache memories included in processor cores 108A and 108B. It is noted that although only two processor cores are depicted in complex 107, in other embodiments, any suitable number of processor cores.

Memory block 102 may include any suitable type of memory such as a Dynamic Random Access Memory (DRAM), a Static Random Access Memory (SRAM), a Read-only Memory (ROM), Electrically Erasable Programmable Read-only Memory (EEPROM), or a non-volatile memory, for example. It is noted that in the embodiment of an integrated circuit illustrated in FIG. 1, a single memory block is depicted. In other embodiments, any suitable number of memory blocks may be employed.

In some cases, Memory block 102 may store a copy of data also stored in cache memories included in processor cores 108A and 108B. In various embodiments, multiple copies of particular data items may be maintained according to a coherency protocol such as, MOESI, for example. Coherent requests and corresponding responses (collectively "transactions" may be transmitted via bus 105). In other embodiments, additional busses connecting different circuit blocks may be employed. Such additional busses may only support non-coherent commands.

Analog/mixed-signal block 103 may include a variety of circuits including, for example, a crystal oscillator, a phase-locked loop (PLL), an analog-to-digital converter (ADC), and a digital-to-analog converter (DAC) (all not shown). In other embodiments, analog/mixed-signal block 103 may be configured to perform power management tasks with the inclusion of on-chip power supplies and voltage regulators. Analog/mixed-signal block 103 may also include, in some embodiments, radio frequency (RF) circuits that may be configured for operation with wireless networks.

I/O block 104 may be configured to coordinate data transfer between integrated circuit 100 and one or more peripheral devices. Such peripheral devices may include, without limitation, storage devices (e.g., magnetic or optical media-based storage devices including hard drives, tape drives, CD drives, DVD drives, etc.), audio processing subsystems, or any other suitable type of peripheral devices. In some embodiments, I/O block 104 may be configured to implement a version of Universal Serial Bus (USB) protocol or IEEE 1394 (Firewire®) protocol.

I/O block 104 may also be configured to coordinate data transfer between integrated circuit 100 and one or more devices (e.g., other computer systems or integrated circuits) coupled to integrated circuit 100 via a network. In one embodiment, I/O block 104 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, I/O block 104 may be configured to implement multiple discrete network interface ports.

It is noted that the embodiment illustrated in FIG. 1 is merely an example. In other embodiments, different functional units, and different arrangements of functional units may be employed.

Figure 2:
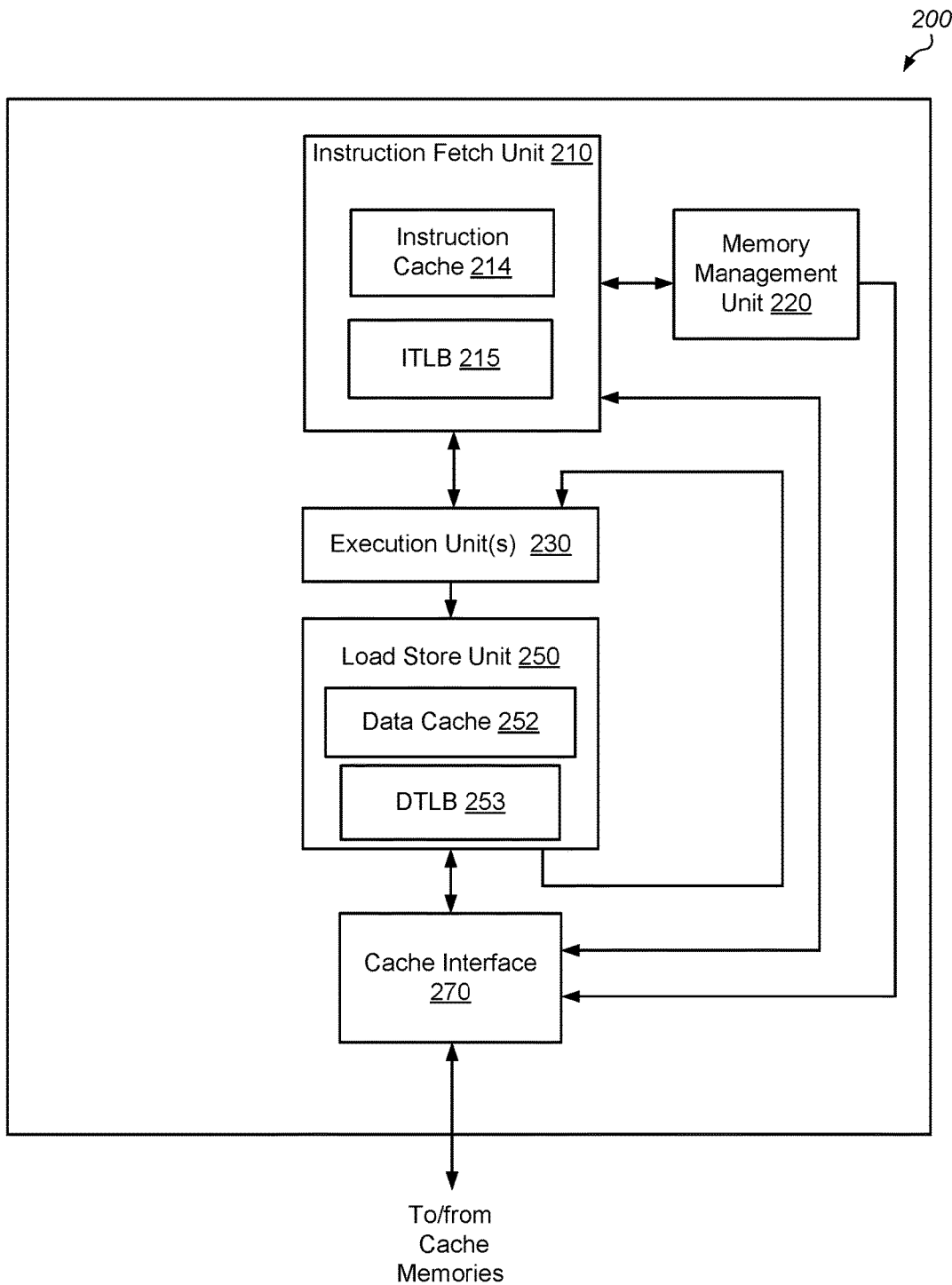
FIG. 2 illustrates a block diagram of an embodiment of a processor core.

A possible embodiment of a cores 108a-b is illustrated in FIG. 2. In the illustrated embodiment, core 200 includes an Instruction Fetch Unit (IFU) 210 coupled to a Memory Management Unit (MMU) 220, a Cache Interface 270, and one or more of Execution Units 230. Execution unit(s) 230 is coupled to Load Store Unit (LSU) 250, which is also coupled to send data back to each of execution unit(s) 230. Additionally, LSU 250 is coupled to cache interface 270, which may in turn be coupled to on-chip network, such as internal bus 105 as shown in FIG. 1, for example.

Instruction Fetch Unit 210 may be configured to provide instructions to the rest of core 200 for execution. In the illustrated embodiment, IFU 210 may be configured to perform various operations relating to the fetching of instructions from cache or memory, the selection of instructions from various threads for execution, and the decoding of such instructions prior to issuing the instructions to various functional units for execution. Instruction Fetch Unit 210 further includes an Instruction Cache 214. In one embodiment, IFU 210 may include logic to maintain fetch addresses (e.g., derived from program counters) corresponding to each thread being executed by core 200, and to coordinate the retrieval of instructions from Instruction Cache 214 according to those fetch addresses. Additionally, in some embodiments IFU 310 may include a portion of a map of virtual instruction addresses to physical addresses. The portion of the map may be stored in an Instruction Translation Lookaside Buffer (ITLB), such as ITLB 215, for example.

Execution Unit 230 may be configured to execute and provide results for certain types of instructions issued from IFU 210. In one embodiment, Execution Unit 230 may be configured to execute certain integer-type instructions defined in the implemented ISA, such as arithmetic, logical, and shift instructions. It is contemplated that in some embodiments, core 200 may include more than one execution unit, and each of the execution units may or may not be symmetric in functionality.

Load Store Unit 250 may be configured to process data memory references, such as integer and floating-point load and store instructions. In some embodiments, LSU 250 may also be configured to assist in the processing of Instruction Cache 214 misses originating from IFU 210. LSU 250 includes Data Cache 352 as well as logic configured to detect cache misses and to responsively request data from a particular cache memory via Cache Interface 270. In one embodiment, Data Cache 252 may be configured as a write-through cache in which all stores are written to a particular cache memory regardless of whether they hit in Data Cache 252. In other embodiments, Data Cache 252 may be implemented as a write-back cache.

In one embodiment, LSU 250 may include a miss queue configured to store records of pending memory accesses that have missed in Data Cache 352 such that additional memory accesses targeting memory addresses for which a miss is pending may not generate additional cache request traffic. In the illustrated embodiment, address generation for a load/store instruction may be performed by one of Execution Unit(s) 230. Depending on the addressing mode specified by the instruction, one of Execution Unit(s) 230 may perform arithmetic (such as adding an index value to a base value, for example) to yield the desired address. Additionally, in some embodiments LSU 250 may include logic configured to translate virtual data addresses generated by Execution Unit(s) 230 to physical addresses. For example, in the present embodiment, LSU 250 includes a Data Translation Lookaside Buffer (DTLB) 253.

It is noted that the embodiment illustrated in FIG. 2 is merely an example and that some circuit blocks have been omitted for clarity. In other embodiments, different numbers of circuit blocks and different arrangements of circuit blocks may be employed.

Figure 3:
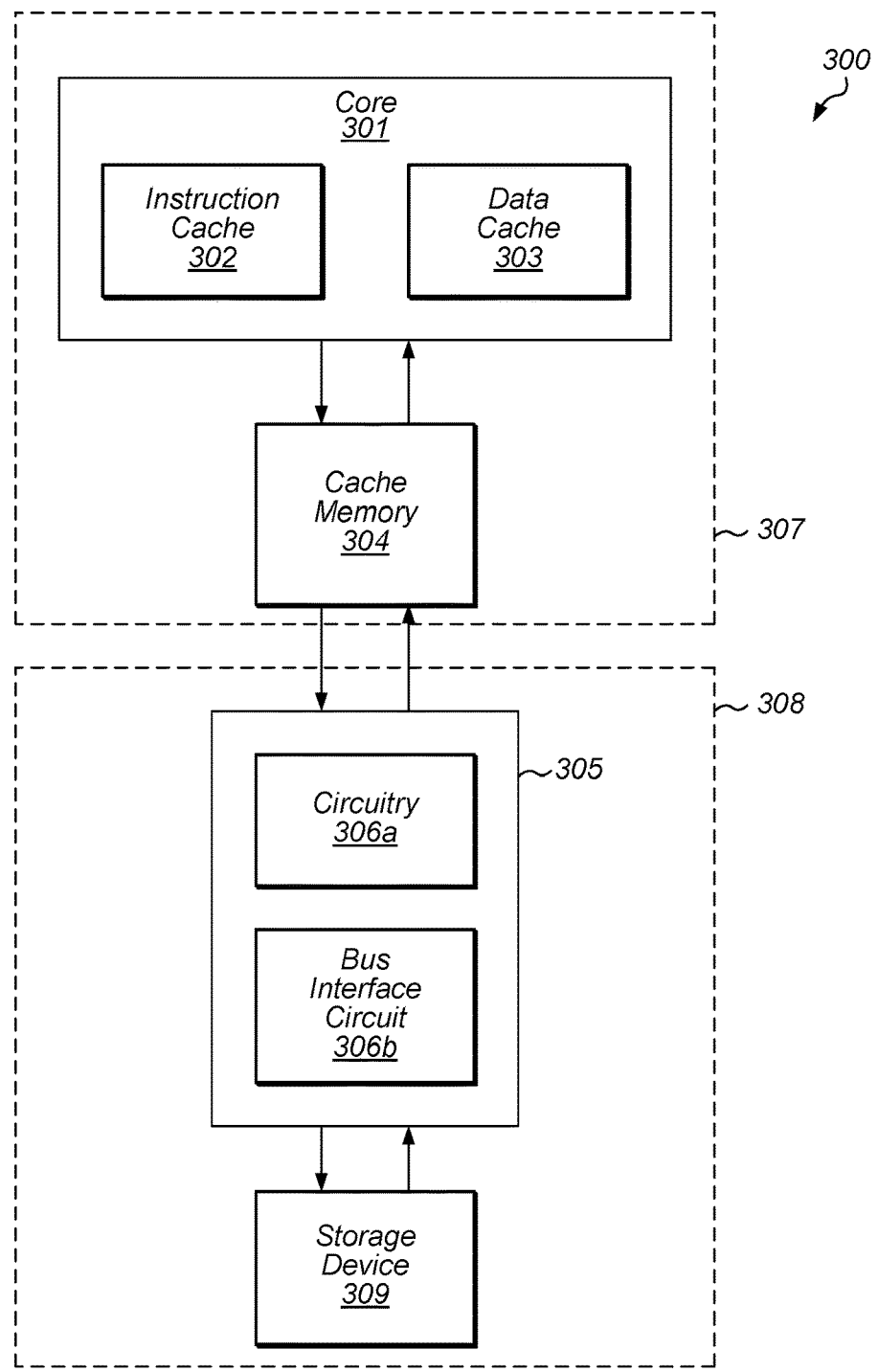
FIG. 3 illustrates a block diagram depicting an embodiment of a non-coherent unit.

Turning to FIG. 3, an embodiment of a computing system employing a non-coherent unit is illustrated. In the illustrated embodiment, system 300 includes Core 301, Cache Memory 304, Non-coherent Unit 305, and Storage Device 309. Core 301 and Cache Memory 304 are included in coherent domain 307, while Non-coherent Unit 305 and Storage Device 309 are included in non-coherent domain 308. Data stored in Instruction Cache 302, Data Cache 303 and Cache Memory 304 may be stored according to a coherency protocol employed in coherent domain 307. In some embodiments, non-coherent domain 308 may employ a coherency protocol different from the coherency protocol employed in coherent domain 307.

In various embodiments, Core 301 may correspond to Core 200 as depicted in the embodiment illustrated in FIG. 2. Core 301 includes Instruction Cache 302 and Data Cache 303, each of which may be implemented according to one of various design styles, such as, e.g., SRAM, DRAM, and the like, and may each be configured to store multiple entries or lines. Data may be stored in each of Instruction Cache 302 and Data Cache 303 according the coherency protocol employed in coherent domain 307. According to the coherency protocol, one or more status bits may be stored for each entry included in Data Cache 302. The value of the status bits may be indicative of the status, such as, whether the entry is dirty, for example. In various embodiments, fetched instructions may be stored in Instruction Cache 302, while operands and the like may be stored in Data Cache 303.

Like Instruction Cache 302 and Data Cache 303, Cache Memory 304 may be configured to store multiple entries or lines according to the coherency protocol. Cache Memory 304 may also be designed according to one of various design styles, such as SRAM, for example. Cache Memory 304 may be able to respond to request from either Core 301 or Non-coherent Unit 305. In some cases, Cache Memory 304 may be able to relay information to Non-coherent Unit 305 that data included in a request from Core 301 is not stored in Cache Memory 304.

Storage Device 309 may, in some embodiments, correspond to Memory 102 as depicted in the embodiment illustrated in embodiment of FIG. 1, and be configured to store and retrieve data in response to requests from Non-coherent Unit 305. Storage Device 309 may be designed according to one of various design styles. For example, Storage Device 309 may be a SRAM, DRAM, or any other suitable type of memory. In some cases, Storage Device 309 may also include hard disc drives, CD-ROMs, or any other suitable forms of storage. In embodiments, where non-coherent domain employs a coherency protocol different from coherent domain 307, data may be stored in Storage Device 309 according to the coherency protocol employed in non-coherent domain 308. Although only a single storage device is shown, in other embodiments, any suitable number of storage devices may be employed.

Non-coherent unit 305 includes Circuitry 306a and Bus Interface Circuit 306b. In various embodiments, Circuitry 306a may include one or more sequential logic circuits (also referred to herein as "state machines") configured to generate commands to access Storage Device 309 dependent upon commands received from Core 301 or Cache Memory 304. Circuitry 306a may also be configured to retrieve or "pull" various lines from Cache Memory 304 and determine their status as specified by the coherency protocol employed in coherence domain 307.

Additionally, Circuitry 306a may be configured to receive responses, as translated by Bus Interface Circuit 306b, from Storage Device 309. Circuitry 306a may then generate additional responses or commands, dependent upon the received responses, to send either Core 301 or Cache Memory 304. Since Storage Device 309 is included in non-coherent domain 308, while Cache Memory 304 and Core 301 are included in coherent domain 307, the responses and commands generated by Circuitry 307, in response to received responses from Storage Device 309, should comply with the coherency protocol employed in coherence domain 307.

Bus Interface Circuit 306b may be configured to modify commands generated by Circuitry 306a to access Storage Device 309 to comply with a particular communication protocol employed on a communication bus. For example, in various embodiments, Bus Interface Circuit 306b may translate commands generated by Circuitry 306a for transmission on bus 105 as illustrated in the embodiment of FIG. 1. In some embodiments, Bus Interface 306b may be further configured to receive responses from Storage Device 309 and translate the received responses to be processed by Circuitry 306a.

It is noted that the embodiment illustrated in FIG. 3 is merely an example. In other embodiments, different circuit blocks and different arrangements of circuit blocks may be employed.

Figure 4:
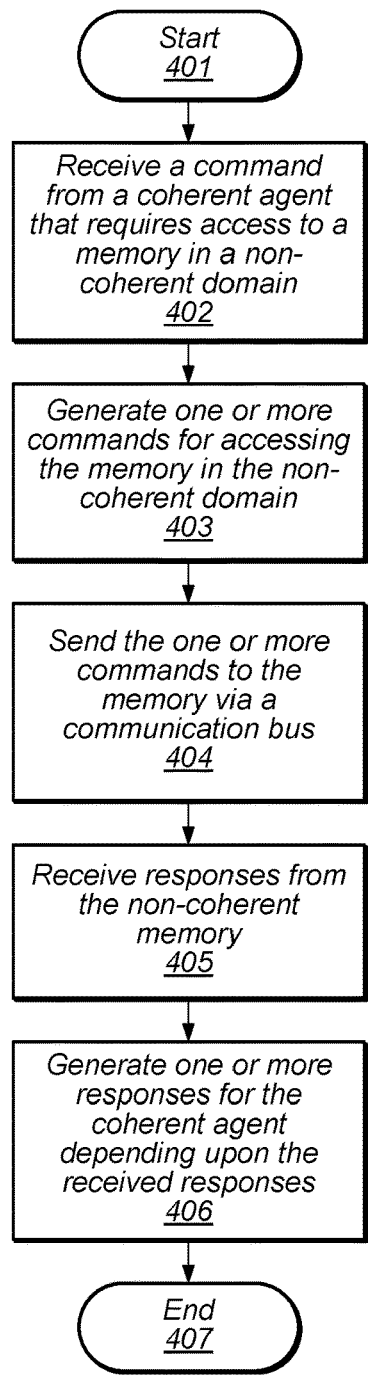
FIG. 4 illustrates a table depicting an embodiment of command translation.

Turning to FIG. 4, a flow diagram depicting an embodiment of a method for operating a non-coherent unit, such as, e.g., Non-coherent Unit 305, is illustrated. Referring collectively to the embodiment of FIG. 3 and the flow diagram of FIG. 4, the method begins in block 401. Non-coherent Unit 305 may then receive a command from a coherent agent, such as Core 301, for example (block 402). In various embodiments, the received command may require access to a memory in a non-coherent domain, such as, Storage Device 309, for example.

Non-coherent unit 305 may then generate one or more commands for accessing the memory in the non-coherent domain (block 403). In various embodiments, the generated commands may include read or write requests to the memory in the non-coherent domain. Non-coherent unit 305 may then send the one or more command to the memory in the non-coherent domain via a communication bus, such as, bus 105 as depicted in the embodiment of FIG. 1, for example (block 404).

Depending on other requests pending for the memory in the non-coherent domain, the memory will perform the commands sent by Non-coherent Unit 305. Upon completing the commands, the memory in the non-coherent domain may send responses, which are received by Non-coherent Unit 305 (block 405). In various embodiments, the response may be sent via a communication bus, such as, bus 105 of FIG. 1, for example.

Non-coherent unit 305 may then generate one or more responses for the coherent agent based on the responses received the memory device in the non-coherent domain (block 406). Since the memory device is included in a non-coherent domain, the responses received from the memory device by Non-coherent Unit 305 cannot be forwarded directly to the coherent agent that initiated the original request. Non-coherent Unit 305 may generate the appropriate responses that allow the coherent agent, such as, Core 301 or Cache Memory 304, to process the responses received from the memory in the non-coherent domain according a coherency protocol. Once Non-coherent Unit 305 has generated the one or more response for the coherent agent, the method may conclude in block 407.

It is noted that the method described in the flow diagram of FIG. 4 is merely an example for device memory operations in a non-coherent domain and can also apply to other memory types in a non-coherent domain. Although the operations are depicted as being performed in a sequential fashion, in other embodiments, one or more of the operations may be performed in parallel.

Figure 6:
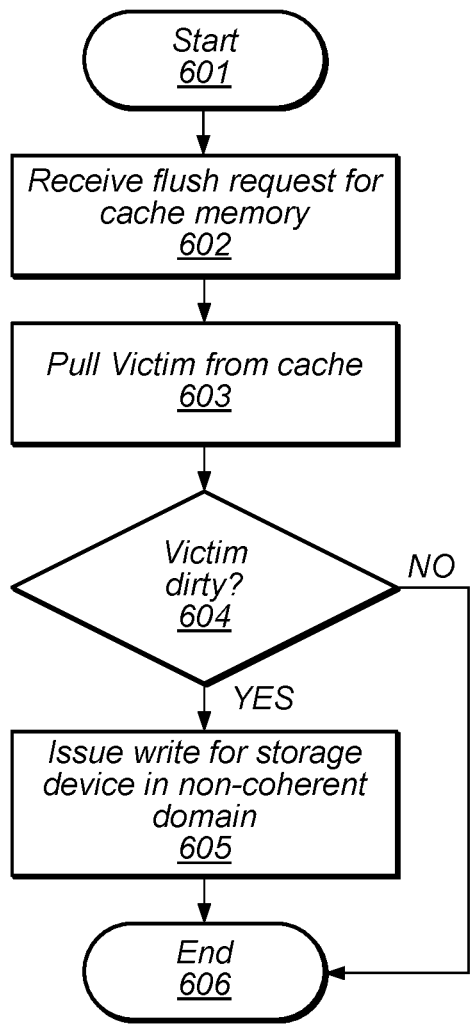
FIG. 6 illustrates a flow diagram depicting another embodiment of a method for operating a non-coherent unit.
Figure 7:
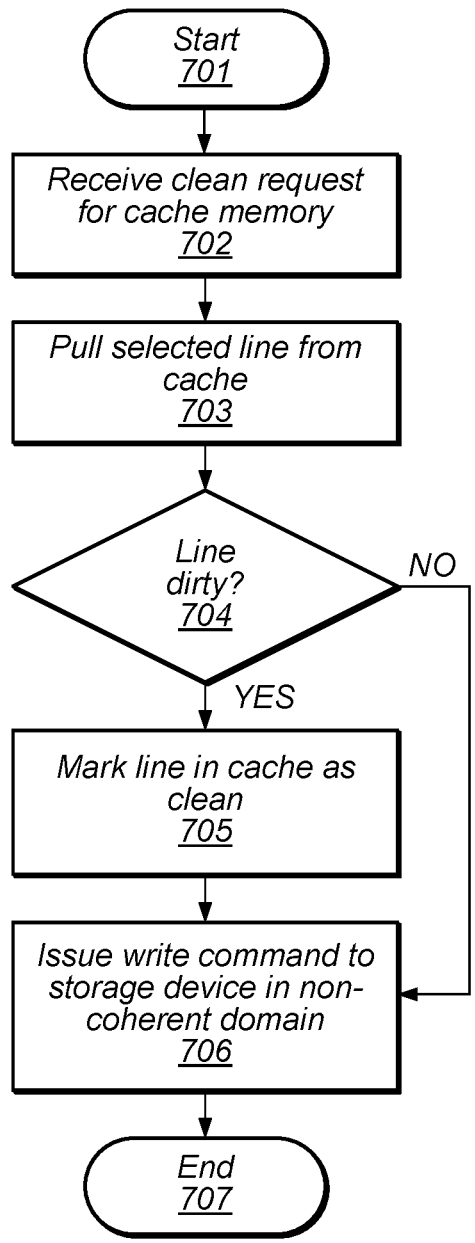
FIG. 7 illustrates a flow diagram depicting an embodiment of a method for performing a cache cleaning operation.

As described above in regard to FIG. 4, the coherent agent may issue a request that will result in access to a memory in a non-coherent domain. Such requests may include many different types of requests. Described below in FIG. 5 through FIG. 7, are possible embodiments of how three different request types may be handled in a computing system that includes coherent and non-coherent domains.

Figure 5:
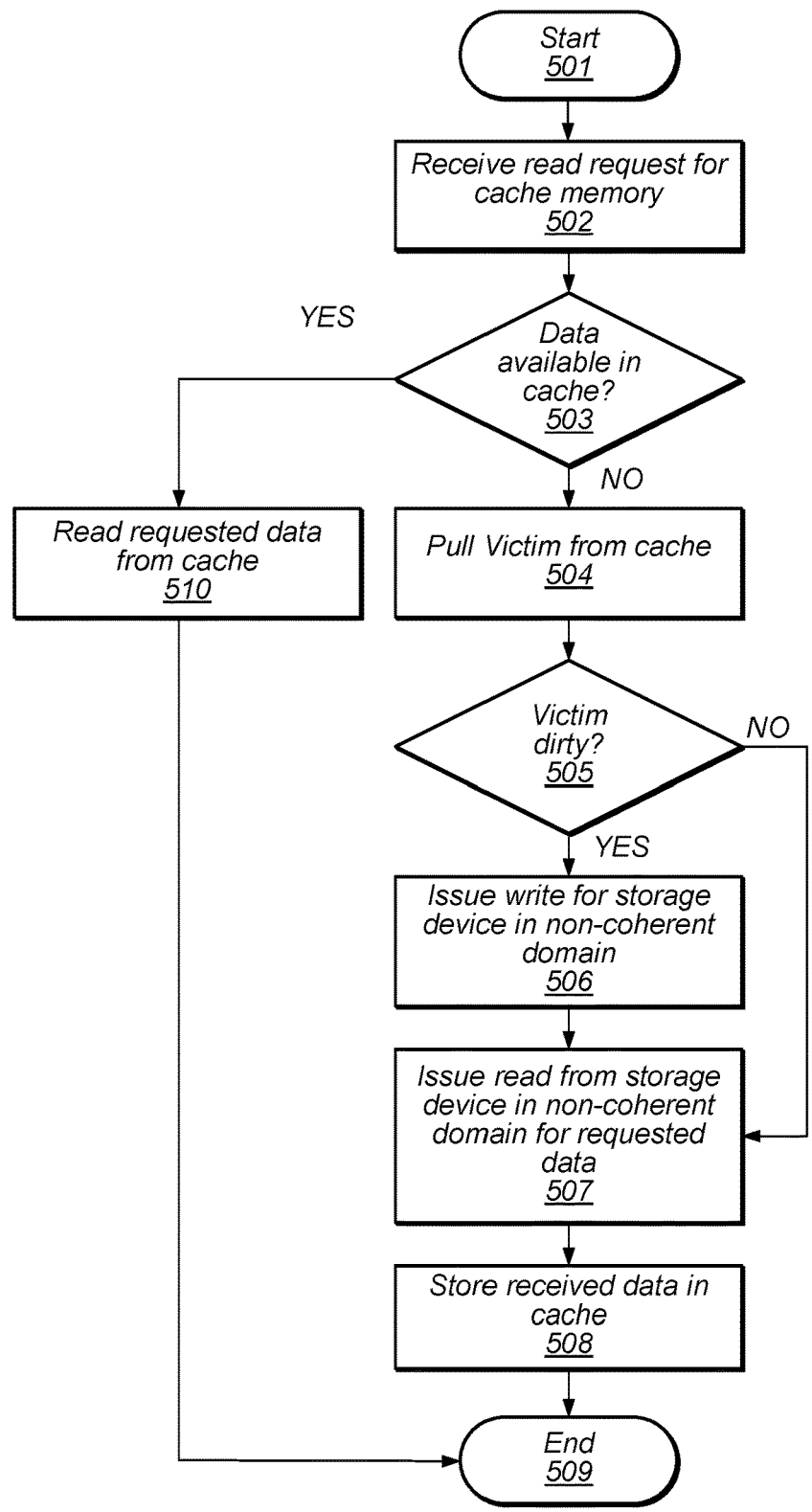
FIG. 5 illustrates a flow diagram depicting an embodiment of a method for operating a non-coherent unit.

Turning to FIG. 5, a flow diagram depicting an embodiment of a method for performing a cache read is illustrated. Referring collectively to the embodiment of FIG. 3 and the flow diagram of FIG. 5, the method begins in block 501. Cache Memory 304 may then receive a read request from Core 301 (block 502). It is noted that, in other embodiments, the read request may be directed to either Instruction Cache 302 or Data Cache 303.

The method may then depend on if the requested data is stored in Cache Memory 304 (block 503). If the request data is available in Cache Memory 304, then Cache Memory 304 retrieves the requested data and returns the retrieved data to Core 301 (block 510). The method may then conclude in block 509.

Alternatively, if the requested data is not available in Cache Memory 304, the data stored at the desired location must be examined, so Non-coherent Unit 305 may then retrieve the data stored at the desired location (block 504). The process of retrieving this data is commonly referred to as "pulling a line" or "pulling a victim." The method may then depend on the status of the victim (block 505).

If the victim is not dirty, i.e., the data has not been modified while being stored in Cache Memory 304, then Non-coherent Unit 305 may issue a read command from Storage Device 309 for the data desired in the original request (block 507). Non-coherent Unit 305 may send the read command to Storage Device 309 via a communication bus, such as, bus 105, for example.

Storage Device 309 may then send the requested data back to Non-coherent Unit 305, which may then store the requested data into the specified location in Cache Memory 304 (block 508). With the storage of the desired data in Cache Memory 304, the method may conclude in block 509.

If, however, the victim is dirty, i.e., the data has been modified since being stored in Cache Memory 304, then the modified data must be written back to non-cache memory, such as, Storage Device 309, for example. To accomplish this, Non-coherent Unit 305 may issue a write command to Storage Device 309 to store the victim's data (block 506). The write command may be issued via a communication bus, such as, bus 105 as depicted in FIG. 1, for example. It is noted that although the write command is issued to Storage Device 309 in the present embodiment, in other embodiments, the write command may be issued to one of various storage devices, such as main memory, a hard disc drive, and the like. Once the write command has been issued, the method may proceed from block 508 as described above.

An embodiment of a method for performing a cache flush operation is illustrated in the flow diagram of FIG. 6. Referring collectively to the embodiment of FIG. 3 and the flow diagram of FIG. 6, the method begins in block 601. A cache flush request may then be received (block 602). The cache flush may be for Instruction Cache 302, Data Cache 303, or Cache Memory 304. For the purposes of discussion, it is assumed that the flush request is targeted at Cache Memory 304.

Non-coherent unit 305 may then pull particular line (also referred to herein as a "victim") from Cache Memory 304 (block 604). When the particular victim is pulled from Cache Memory 304, Non-coherent Unit 305 may determine a status of the victim by checking one or more associated status bits. The method may then depend on the status of the victim.

If the victim is not dirty, i.e., the data included in the victim has not been modified while being stored in Cache Memory 304, then the method may conclude in block 606. Alternatively, if the victim is dirty, i.e., the data included in the victim has been modified while being stored in the Cache Memory 304, then Non-coherent Unit 305 may issue a write command to store the data include in the victim to Storage Device 309 included in Non-coherent domain 308. Once the write command has been issued to Storage Device 309, the method may conclude in block 606.

It is noted that embodiment of the method illustrated in FIG. 6 is merely an example. In other embodiments, different operations and different orders of operations are possible and contemplated.

Turning to FIG. 7, a flow diagram depicting an embodiment of a method for performing a cache clean operation in a computing system is illustrated. Referring collectively to the embodiment of FIG. 3 and the flow diagram of FIG. 7, the method begins in block 701. A request to clean one of cache memories Instruction Cache 302, Data Cache 303, or Cache Memory 304 may then be received (block 702). For the purposes of discussion, it is assumed that the request is directed to Cache Memory 304, although the operations described below would be similar if Instruction Cache 302 or Data Cache 303 were selected. The request may be received from Core 301 in response to the execution of program instructions included in a software program.

As part of the request to clean Cache Memory 304, a particular line included in Cache Memory 304 is pulled by Non-coherent Unit 305 (block 703). When the particular cache line is read from Cache Memory 304, status bits associated with the particular cache line may also be read. Such status bits may indicate the state of the particular cache lines. For example, the status bits may indicate that the particular cache line is dirty. The method may then depend on whether the particular cache line is dirty (block 704).

If the particular cache line is not dirty, then Non-coherent Unit 305 may issue a write command to Storage Device 309 (block 706). Since Storage Device 309 is located with Non-coherent domain 308, any storage of data in Storage Device 309 does not need to comply with a coherency protocol. As such, the write command issued by Non-coherent Unit 305 may not comply with a particular coherency protocol. Once the write command has been issued to Storage Device 309, the method may conclude in block 706.

Alternatively, if the particular cache line is dirty, then Non-coherent Unit 305 may mark the particular cache line as clean (block 705). In various embodiments, Non-coherent Unit 305 may change one or more status bits associated with the particular cache line in order to reflect the updated status. In other embodiments, the request to clean may also include a request to invalidate. In such cases, in response to a determination that the particular cache line is dirty, Non-coherent Unit 305 may invalidate the particular cache line.

As described above, Non-coherent Unit 305 may modify values of one or more status bits to indicate that the particular cache line has been invalidated. Once the status of the particular cache line has been updated, the method may proceed from block 706 as described above.

It is noted that the embodiment of the method illustrated in FIG. 7 is merely an example. In other embodiments, different operations and different orders of operations are possible and contemplated.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
  a coherent domain including a processor and a first memory configured to store data according to a coherency protocol; and
  a non-coherent domain including a second memory and an interface circuit coupled to the first and second memories;
  wherein the first memory is further configured to relay a first command from the processor to the interface circuit in response to a determination that the first command is to access the second memory; and
  wherein the interface circuit is configured to:
    receive the first command relayed from the first memory;
    retrieve data from the first memory using address information included in the first command;
    generate one or more second commands to access the second memory using the first command and status information associated with the retrieved data; and
    in response to receiving a response from the second memory, generate one or more responses for the processor based on the response.

2. The apparatus of claim 1, wherein the interface circuit is further configured to send the one or more second commands to the second memory via a communication bus.

3. The apparatus of claim 2, wherein the interface circuit is further configured to receive one or more first responses from the second memory.

4. The apparatus of claim 3, wherein the interface circuit is further configured to generate one or more second responses in response to the first command using the one or more first responses.

5. The apparatus of claim 1, wherein the one or more second commands include a request to access second data is stored in the second memory.

6. The apparatus of claim 1, wherein the one or more second commands include a request to store third data in the second memory.

7. A method, comprising:
- sending, by a processor in coherent domain, a first command to a first memory in the coherent domain, wherein the first command includes a request access a second memory in a non-coherent domain;
- relaying, by the first memory, the first command to an interface circuit;
- receiving, by the interface circuit, the first command relayed from the first memory;
- retrieving data from the first memory using address information included in the first command;
- generating, by the interface circuit, one or more second commands to access the second memory using the first command and status information associated with the retrieved data;
- sending the one or more second commands, by the interface circuit, to the second memory; and
- in response to the interface circuit receiving a response from the second memory, generating one or more responses for the processor based on the response.

8. The method of claim 7, further comprising sending the one or more second commands to the second memory via a communication bus.

9. The method of claim 8, further comprising receiving, by the interface circuit, one or more first responses from the second memory.

10. The method of claim 9, further comprising generating, by the interface circuit, one or more second responses in response to the first command based on the one or more first responses received from the second memory.

11. The method of claim 7, wherein one or more second commands include a request to read data stored in the second memory.

12. The method of claim 7, wherein generating, by the interface circuit, the one or more responses includes generating at least one response to another to access another memory included in the coherency domain.

13. The method of claim 7, wherein the one or more second commands include a request to store data in the second memory.

14. A system, comprising:
- a non-coherent domain including a memory and an interface circuit;
- a coherent domain including:
  - a cache memory configured to store data in accordance with a coherency protocol;
  - a processor configured to send a first command to the cache memory, wherein the first command includes a request to access the memory; and
  - wherein the cache memory is further configured to relay the first command to the interface circuit;
- wherein the interface circuit is further configured to:
  - receive the first command from the cache memory;
  - retrieve data from the cache memory using address information associated with the first command;
  - generate one or more second commands to access the memory using the first command and status information associated with the retrieved data; and
  - send the one or more second commands to the memory.

15. The system of claim 14, wherein the interface circuit is further configured to receive one or more first responses from the memory.

16. The system of claim 15, wherein the interface circuit is further configured to generate one or more second responses in response to the first command based on the one or more first responses.

17. The system of claim 14, wherein the one or more second commands include a different request to read data previously stored in the memory.

18. The system of claim 17, wherein the first command includes another request to access data in the cache memory, and wherein the interface circuit is further configured to generate the one or more second commands in response to a determination that the data is not stored in the cache memory.

19. The system of claim 14, wherein the one or more second commands include a different request to store data in the memory.

* * * * *